US010574675B2

(12) United States Patent
Peppe et al.

(10) Patent No.: US 10,574,675 B2
(45) Date of Patent: *Feb. 25, 2020

(54) SIMILARITY SEARCH FOR DISCOVERING MULTIPLE VECTOR ATTACKS

(71) Applicant: T-Mobile USA, Inc., Bellevue, WA (US)

(72) Inventors: Brett C. Peppe, Bellevue, WA (US); Gregory R. Reith, Federal Way, WA (US)

(73) Assignee: T-Mobile USA, Inc., Bellevue, WA (US)

(*) Notice: Subject to any disclaimer, the term of this patent is extended or adjusted under 35 U.S.C. 154(b) by 262 days.

This patent is subject to a terminal disclaimer.

(21) Appl. No.: 15/668,580

(22) Filed: Aug. 3, 2017

(65) Prior Publication Data

US 2017/0346839 A1 Nov. 30, 2017

Related U.S. Application Data

(63) Continuation-in-part of application No. 14/958,792, filed on Dec. 3, 2015, now Pat. No. 10,216,938.

(Continued)

(51) Int. Cl.
*H04L 29/06* (2006.01)

(52) U.S. Cl.
CPC ...... *H04L 63/1416* (2013.01); *H04L 63/1433* (2013.01)

(58) Field of Classification Search
CPC ............. H04L 63/1416; H04L 63/1408; H04L 63/1441; H04L 63/1458; G06F 21/552

(Continued)

(56) References Cited

U.S. PATENT DOCUMENTS 8,418,249 B1  4/2013  Nucci et al.
8,505,092 B2  8/2013  Durie et al.
(Continued)

FOREIGN PATENT DOCUMENTS

CN  101452469 A  6/2009
CN  101599855 A  12/2009
(Continued)

OTHER PUBLICATIONS

The Notice of Allowance for U.S. Appl. No. 14/958,792 dated Sep. 25, 2018, 17 pages.
(Continued)

*Primary Examiner* — Evans Desrosiers
(74) *Attorney, Agent, or Firm* — Hans Santos, PLLC

(57) ABSTRACT

A similarity search may be performed on a digraph to identify additional attack vectors that are potentially under attack in response to an initial attack vector being under attack. Security event data that includes attack histories of assets and threat actor data on threat actors are received. A digraph that maps threat actors to attack vectors of the assets is generated based on the attack histories. A risk probability of attack may be calculated for an attack vector of an asset based on the digraph, such that the attack vector may be determined to be under attack in response to the risk probability exceeding a predetermined probability threshold. Subsequently, a similarity search on the digraph may be performed in view of the attack vector that is determined to be under attack to identify additional attack vectors of the asset or another other asset that are potentially under attack.

20 Claims, 9 Drawing Sheets

Related U.S. Application Data

(60) Provisional application No. 62/088,479, filed on Dec. 5, 2014.

(58) Field of Classification Search
USPC .......................................................... 726/25
See application file for complete search history.

(56) References Cited

U.S. PATENT DOCUMENTS

| | | | |
|---|---|---|---|
| 8,584,233 B1 | 11/2013 | Yang et al. | |
| 8,935,784 B1 | 1/2015 | Srinath | |
| 2003/0236652 A1 | 12/2003 | Scherrer et al. | |
| 2005/0229256 A2 | 10/2005 | Banzhof | |
| 2006/0174319 A1* | 8/2006 | Kraemer | G06F 21/53 726/1 |
| 2007/0226796 A1 | 9/2007 | Gilbert et al. | |
| 2007/0291118 A1 | 12/2007 | Shu et al. | |
| 2008/0162592 A1 | 7/2008 | Huang et al. | |
| 2009/0077666 A1 | 3/2009 | Chen et al. | |
| 2013/0318615 A1* | 11/2013 | Christodorescu | G06F 21/00 726/25 |
| 2013/0325545 A1 | 12/2013 | Mordvinova et al. | |
| 2014/0331320 A1* | 11/2014 | Satish | G06F 21/56 726/23 |
| 2014/0351939 A1 | 11/2014 | Moore et al. | |
| 2015/0310217 A1 | 10/2015 | Artes et al. | |
| 2015/0381649 A1 | 12/2015 | Schultz et al. | |
| 2016/0098565 A1 | 4/2016 | Vedula et al. | |
| 2016/0154960 A1* | 6/2016 | Sharma | G06F 21/56 726/25 |
| 2016/0350165 A1 | 12/2016 | LeMond et al. | |
| 2017/0063910 A1 | 3/2017 | Muddu et al. | |
| 2017/0346839 A1 | 11/2017 | Peppe et al. | |
| 2018/0247058 A1 | 8/2018 | Burt et al. | |

FOREIGN PATENT DOCUMENTS

| | | |
|---|---|---|
| CN | 101655787 A | 2/2010 |
| CN | 101682626 A | 3/2010 |
| CN | 102103677 A | 6/2011 |
| CN | 103312679 A | 9/2013 |
| CN | 102638458 B | 9/2015 |
| CN | 102447695 B | 12/2015 |
| EP | 1768044 A2 | 3/2007 |
| WO | 2014182326 A2 | 11/2014 |
| WO | 2014182326 A3 | 9/2015 |

OTHER PUBLICATIONS

Non-Final Office Action for U.S. Appl. No. 14/958,792 dated Mar. 22, 2018, 25 pages.
Supplementary European Search Report for European Application No. EP 15864973.4 dated Jun. 5, 2018, 7 pages.
The Final Office Action for U.S. Appl. No. 14/958,792 dated Jul. 24, 2018, 18 pages.
The International Search Report and Written Opinion for PCT Application No. PCT/US2015/064034, dated Jun. 3, 2016, 11 pages.
Kistner, Jason, "Cyber Attack Simulation and Information Fusion Process Refinement Optimization Models for Cyber Security," Industrial Engineering, Rochester Institute of Technology, Jul. 2006.
Changwei Liu et al., "Creating Integrated Evidence Graphs for Network Forensics" Digital Forensics: IFIP International Conference on Digital Forensics, Advances in Digital Forensics IX, 9th IFIP WG 11.9 International Conference on Digital Forensics, Orlando, FL, USA, Jan. 28-30, 2013, pp. 227-241, See pp. 230-239.
The International Search Report and Written Opinion for PCT Application No. PCT/US2018/045153, dated Nov. 27, 2018, 15 pages.
Chinese Patent Application No. 201580074304.5, Office Action dated Dec. 23, 2019, 6 pages.

* cited by examiner

SIMILARITY SEARCH FOR DISCOVERING MULTIPLE VECTOR ATTACKS

CROSS REFERENCE TO RELATED PATENT APPLICATIONS

This patent is a continuation-in-part of U.S. patent application Ser. No. 14/958,792, entitled "Recombinant Threat Modeling," filed on Dec. 3, 2015, which claims priority to U.S. Provisional Patent Application No. 62/088,479, filed on Dec. 5, 2014, entitled "Threat Model," which are hereby incorporated by reference in their entirety.

BACKGROUND

Enterprises are constantly under cyber-attack, or electronic attack of computing resources and data (hereinafter all of an enterprise's computing resources and data, not just the connectivity resources, are called a "network"). From the years 2011 to 2015 there have been at least seven hundred (700) documented major cyber-attacks on enterprise and government networks in the United States as well as many others outside of the United States. Some attacks steal data, while other attacks steal money or electronic access to money. Yet others maliciously destroy data, or cause denial of service. These attacks not only degrade the integrity of the specific networks under attack, but also the user's confidence in all networks. Accordingly, cyber security officers and others responsible for computer security, are constantly challenged to defend their networks against cyber-attack.

Cyber security officers are therefore responsible for developing and maintaining a threat model for the networks under their charge. A threat model identifies vulnerabilities in those networks, and may further identify or help to identify techniques to mitigate any identified respective computer security risk. Application of those techniques is called remediation.

However, the scale, sophistication, and variety of attacks presently targeting enterprise and government computing resources have increased. For example, sophisticated attackers may use a multiple vector attack to simultaneously target multiple vulnerabilities of the computing resources that belong to an enterprise. A conventional security application may fail to detect one or more aspects of a multiple vector attacks, thereby leaving some attack vectors of the computing resources vulnerable even if other attack vectors are successful protected using newly instituted protection measures.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
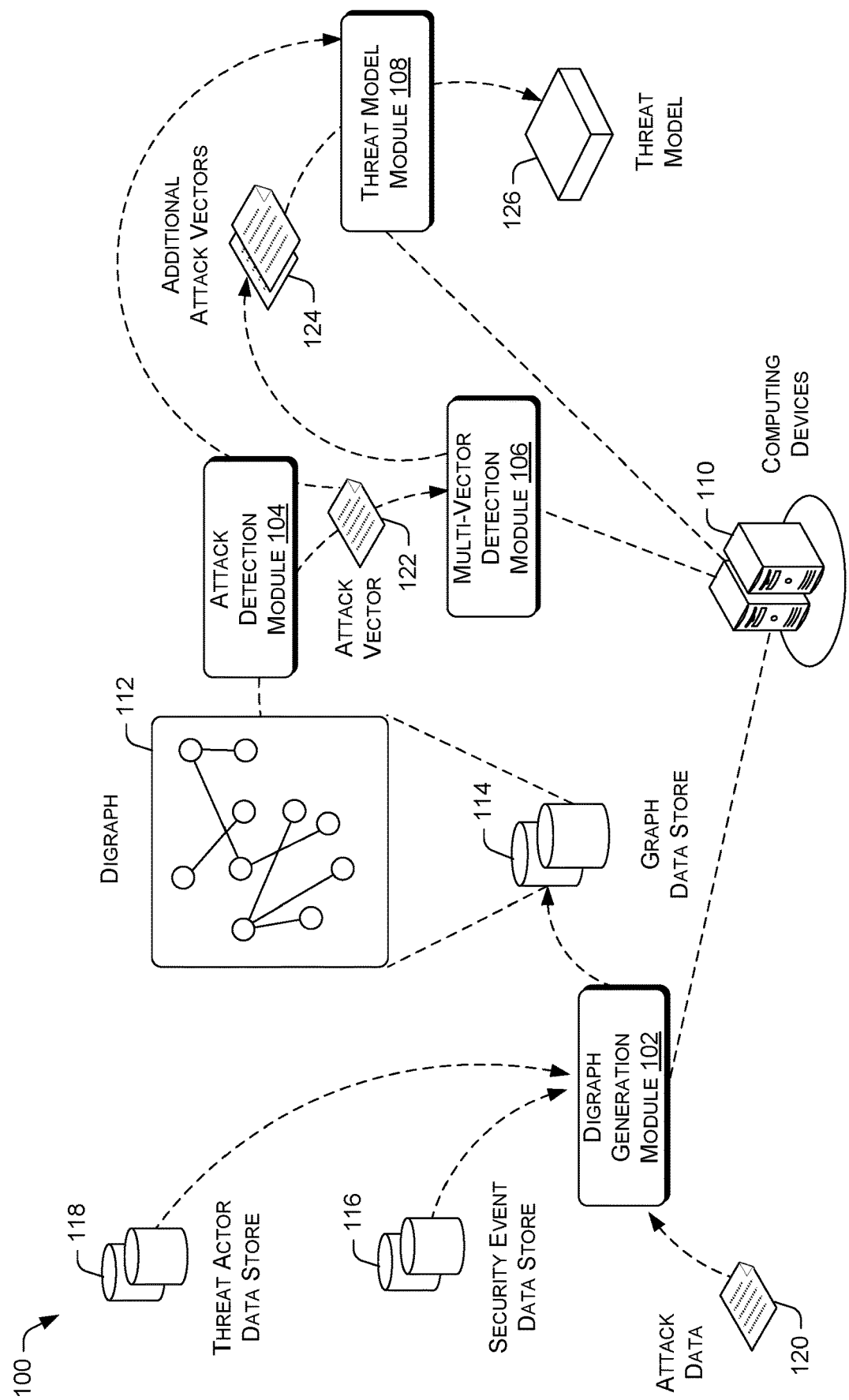
FIG. 1 illustrates an example architecture for using a similarity search to discover a multiple vector attack on the assets of an enterprise.

This disclosure is directed to techniques for using a similarity search to discover a multiple vector attack on the assets of an enterprise. An asset is an entity that provides benefit to an enterprise, and which may be compromised by an attacker. For example, an asset may be a computing resource or a network resource of the enterprise, or alternatively, a person or individual that works for the enterprise. A multiple vector attack is an attack that simultaneous target multiple attack vectors (vulnerabilities) of one or more assets of the enterprise.

The threat environment faced by enterprise and government entities has changed dramatically in the last few years from simple disruption of services ("hacking") to significant economic theft, in terms of both monetary loss, intellectual property, and data. The risk control strategy employed by corporations has been forced to change from one based on policy and controls to one that includes sophisticated security appliances that assess, measure and track vulnerabilities. Most security applications monitor the Security Information and Event Management (STEM) logs and score the issues discovered, and then put in place a mitigation response for remediation. However as sophisticated corporate risk profiling strategies evolve, those strategies are still defensive and reactive to an ever more dangerous set of offensive adversaries.

Present day enterprises and governments have a critical dependence on information infrastructure to promote their products and services, communicate with their customers and facilitate communication across graphically distributed work sites, employees and data centers. Each of these access points has an attack surface that is defined by its configuration and known vulnerabilities. Successful attacks are characterized by Common Vulnerabilities and Exposures (CVE), Computer Emergency Response Team (CERT) and other reports from security researchers. However, recognizing these attacks is based on after the fact recognition of the attack signature itself.

The economic incentive that drives and funds the development of ever more sophisticated attacks, such as multiple vector attacks, has led to enormous differentiation in the threat space. It is no longer sufficient to organize and direct risk mitigation and remediation after detection, because it is based on attack signatures that have appeared on the attack surfaces. For example, convention risk management tools deal reasonably well with Tier I and II threats through security policy, data governance and security appliances. Tier VI attacks are essentially invisible to a vulnerability scanning tools because the exploit created a custom vulnerability that did not exist previously and thus has no signature to detect. Tier V attacks are similar in being very difficult to detect and remediate.

A threat can be understood as a particular entity that has the capability and willingness to exploit a vulnerability using different attack processes. For example, older versions of a Windows NT™ server is vulnerable to being crashed by a pinging a weak port (known as the "Ping of Death"). Thus the NT Ping of Death threat is the correlation of the vulnerable port against the pinging of a known port. In this way, a vulnerability is a weakness in the defenses of a network, often referred to as an attack vector. An attack is the exploiting of that vulnerability. A threat, also referred to as a threat actor, is the party or entity that may perform, or is performing a particular attack. The set of vulnerabilities or attack vectors for a particular portion of the network is called the attack surface for that portion of the network. It is important to point out that threats need not make use of vulnerabilities that are technical in nature, but may be non-technical (e.g., a threat from a compromised worker or disgruntled worker).

The detection of a multiple vector attack initially involves the generation of a directed graph, i.e., digraph, that maps the relationships between the threat actors and the attack vectors of one or more assets of an enterprise. The digraph may be generated using multiple sources of data, such as data from a security event data store, a threat actor data store, and/or attack data that indicates historical and new attacks on the assets of the enterprise. The digraph is used to calculate a risk probability of an attack on an attack vector of an asset, in which the risk probability being above a threshold may indicate that the attack is occurring on the attack vector. Subsequently, a similarity search is performed on the digraph to identify one or more additional attack vectors of the asset or another asset having similar attributes to the attack vector that is under attack. Accordingly, the one or more additional attack vectors as identified may be designated as being potentially under attack. In various embodiments, the similarity search may be topological similarity search, a semantics-based similarity search, a statistical similarity search, or another computer-implemented search of the digraph.

In this way, the attack vector that is currently experiencing the attack and the one or more additional vectors that are determined by the similarity search as potentially under attack may be identified as being targeted by the same multiple vector attack. In contrast, a conventional security application may fail to detect such a multiple vector attack, thereby leaving some attack vectors of the assets vulnerable even if other attack vectors are successful protected by remedial protection measures. The techniques described herein may be implemented in a number of ways. Example implementations are provided below with reference to the following figures.

Example Architecture

FIG. 1 illustrates an example architecture for using a similarity search to discover a multiple vector attack on the assets of an enterprise. The architecture 100 may include a digraph generation module 102, an attack detection module 104, a multi-vector detection module 106, and a threat model module 108. The modules 102-108 may be implemented on one or more computing devices 110. The computing devices 110 may include general purpose computers, such as desktop computers, tablet computers, laptop computers, servers, or other electronic devices that are capable of receive inputs, process the inputs, and generate output data. In other embodiments, the computing devices 110 may be virtual computing devices in the form of virtual machines or software containers that are hosted in a cloud.

The digraph generation module 102 may generate digraphs, such as the digraph 112, for storage in the graph data store 114. In various embodiments, the digraph generation module 102 may generate the digraph 112 using data from multiple data sources, such as the security event data store 116, the threat actor data store 118, and attack data 120. The security event data store 116 may include security event data from SIEM applications, Intrusion Detection Systems (IDSs), and/or vulnerability scanners that monitors the assets of the enterprise. The data feeds of the security event data may include system logs, event monitor logs, scan logs, and/or so forth. Security data feeds may also arrive from external sources, such as third-party privately operated network security event monitoring applications, network event detection systems operated by governmental agencies, and/or so forth. Accordingly, the data feeds may provide attack data 120 on historical attacks that have occurred on the assets of the enterprise or attacks that are currently occurring on the assets. The attack data for an attack may indicate the nature of attack, the attack vector that is compromised, the detectable events (indicators) associated with attack, the response that remediated the attack, and/or so forth.

The threat actor data store 118 may include data profiles on the various threat actors that have attacked or may potentially attack the assets of the enterprise. For example, Tier 1 and 2 actors tend to be intent based actors that target an asset for the purpose of theft, as a source of expressing anger, or in an attempt to damage the reputation of the enterprise. On other hand, Tier 3 and 4 actors tend to be opportunity based actors that target an asset for the purpose of hactivism, financial gain, or undermining the command and control (C&C) systems of an enterprise. In another example, Tier 5 and 6 actors may target an asset for intelligence reasons, such as to compromise control of key infrastructures, pursuing espionage campaigns to obtain information of economic or industrial value, or compromise critical systems, people, and knowledge of an enterprise. Higher tier attacks may develop over longer time scales, and an asset is potential target of such attacks if a threat actor (1) has suitable motivation; (2) is active in a threat space; (3) is capable of the attack; and (4) has access to the asset.

Accordingly, the digraph 112 that is generated by the digraph generation module 102 may map the threat actors to the attack vectors of the assets of the enterprise based on the historical attack information. In various embodiments, the digraph 112 may include nodes that correspond to the assets of the enterprise, and edges connecting the nodes may indicate the relationship between the assets. For example, a pair of nodes may represent two computing devices of the enterprise. The edge between the nodes may correspond to the exchange of data between the computing devices, in which the edge may be a unidirectional edge or a bidirectional edge. In one scenario, the edge may be a unidirectional edge from the first node to the second node when the first computing device is able to receive data from the second device, but not vice versa, i.e., a one-way data flow. In another scenario, a bidirectional edge may connect the first node and the second node when the first and second computing devices are able to mutually exchange data with each other. In another example, a pair of nodes may represent human workers of the enterprise rather than computing devices. In such an example, the edge between the nodes may indicate the working relationship between the nodes, such as supervisor and subordinate, vendor and customer, co-workers, and/or so forth. The nodes may be further connected other nodes that represent the attack vectors (vulnerabilities) of the assets and/or the threat actors.

The attack detection module 104 may use the mapping data in the digraph 112 to calculate a risk probability of an attack on an associated attack vector of asset. The risk probability of the attack may be calculated using a probabilistic inference algorithm that perform inference and approximation functions on the digraph 112. Subsequently, the attack detection module 104 may compare the calculated risk probability of an attack to a predetermined probability threshold. Accordingly, if the risk probability of the attack exceeds the predetermined probability threshold, the attack detection module 104 may determine that an attack is occurring on the associated attack vector of the asset. Otherwise, the attack detection module 104 may determine that no attack is being perpetrated on the associated attack vector. In various embodiments, the attack detection module 104 may perform such risk probability calculation and attack analysis for multiple attack vectors of multiple assets that are captured in the digraph 112.

In some embodiments, the digraph generation module 102 may receive new attack data that indicates one or more previously unknown historical attacks or new attacks on assets following the calculation of a risk probability of an attack for an attack vector of an asset. The new attacks may include real-time attacks and/or imminent attacks on the assets. The new attack data may be received from internal sources and/or external sources. The internal sources may include one or more security applications that are monitoring the assets of the enterprise. The external sources may include third-party privately operated network security event monitoring applications, network event detection systems operated by governmental agencies, and/or so forth. The attack data from the external sources may be relevant to the attack vectors of the assets that belong to the enterprise and/or similar attack vectors of comparable assets that belong to other enterprises. Attack on the similar attack vector of such comparable assets may be treated by the digraph generation module 102 as indications of imminent attack on the corresponding attack vectors of the assets belonging to the enterprise. The new attack data for an attack may indicate the nature of attack, the attack vector that is compromised, the detectable events (indicators) associated with attack, the response that remediated the attack, and/or so forth. In turn, the digraph generation module 102 may update the digraph 112 based on the new data. In various embodiments, the update of the digraph 112 may be implemented via the generation of a new version of the digraph 112 that takes into account the new attack data. Subsequently, the digraph generation module 102 may trigger the attack detection module 104 to repeat the performance of risk probability calculation. The repetition of the risk probability calculation based on the updated digraph 112 may result in a different risk probability being calculated for an attack vector of an asset. For example, the attack detection module 104 may initially calculate that the risk probability of an attack on a Policy and Charging Rules Function (PCRF) software node of a wireless carrier network is approximately 75%. Subsequently, the digraph generation module 102 may generate a new digraph 112 after receiving additional attack data that indicates the PCRF software node of another wireless carrier network was attacked. As a result, a risk probability re-calculation for the (PCRF) software node of a wireless carrier network may indicate a risk probability of 95%.

Once the attack detection module 104 has determined that a particular attack vector 122 of an asset is under attack, the multi-vector detection module 106 may perform a similarity search on the digraph 112 to identify additional attack vectors 124 of the asset or another asset that are also potentially under attack. The similarity between the particular attack vector 122 and the additional attack vectors 124 may indicate that the additional attack vectors 124 are also susceptible to attack, such as a multiple vector attack. The similarity search may be topological similarity search, a semantics-based similarity search, a statistical similarity search, or another computer-implemented search of the digraph.

In some embodiments, the multi-vector detection module 106 may ascertain an attribute value of a specific attribute for an attack vector, in which the attack vector (e.g., the attack vector 122) belongs to an asset that is determined to be under attack. The multi-vector detection module 106 may also determine an attribute value of the specific attribute belong to each remaining attack vectors of the asset or attack vectors of other assets in the enterprise. An attribute may be a parameter of an attack vector for an asset, and the corresponding attribute value of the attribute may quantify or qualify the attribute. For example, an attribute of an attack vector may be a model name of the attack vector, a software version number of the attack vector, the number of data exchange events that the underlying asset of the attack vector has with another asset, the protocol standard used to carry out the data exchange events, the relationship of the attack vector to other attack vector, and/or so forth.

Subsequently, the multi-vector detection module 106 may compare the attribute value for an attack vector of an asset that is found to be under attack, i.e., the baseline attribute value, to a target attribute value. The target attribute value may be a corresponding attribute value that belongs to a remaining attack vector of the asset or an attack vector of another asset in the enterprise. The comparison is performed via a generation of a similarity score for the baseline attribute value to a target attribute value. In some embodiments, the similarity between the two attribute values may be the normalized sum of the constituent pairwise attribute similarities. In this way, a similarity score may show a similarity between the baseline attribute value and the target attribute value. For example, the difference between a baseline attribute value of 0.9 and a target attribute value of 0.85 may result in a similarity score of 94. Thus, when the similar score exceeds a predetermined similarity score threshold (e.g., a similarity score threshold of 70), the multi-vector detection module 106 may determine that the attack vector with the target attribute value is at risk of attack. Otherwise, the multi-vector detection module 106 may determine that the attack vector with the target attribute value is not at risk of attack. The multi-vector detection module 106 may perform such a similar score procedure for each target attribute value of interest with a baseline attribute value to determine whether an attack vector associated with each target attribute value is at risk of attack.

In some embodiments, the multi-vector detection module 106 may modify a baseline attribute value and/or a target attribute value with a corresponding weight value prior to the performance of a comparison. The weighting may be performed based on one or more characteristics that are common to the attack vector associated with the baseline attribute value and attack vector associated with the target attribute value, in which the characteristics impact the enterprise. The characteristics for an attack vector may include a frequency that the attack vector exchanges data with another attack vector or asset, an importance of the attack vector to the operations of the enterprise, a cost associated with a failure or malfunction of the attack vector, sensitivity of the attack vector to attack, and/or so forth. For example, an attack vector that performed 100 data communication transactions with another attack vector or asset in a predetermined time period may be assigned a weight value of 1.0, while another attack vector that performed 80 data communication transactions in the predetermined time period may be assigned a weight value of 0.8. In another example, a first attack vector that is twice as important to the operations of an enterprise than a second attack vector may have a weight factor value that is two times the weight factor value for the second attack vector. Accordingly, for each attribute value, the multi-vector detection module 106 may multiply a weight factor with an associated attribute value of an attack vector to adjust the associated attribute value.

In some embodiments, the weight value for an attribute value of an attack vector may be automatically assigned by a weighting component of the multi-vector detection module 106 that assesses the characteristics of the attack vector. For example, the weighting component may track the number of data communication events for multiple attack vectors, and then translate the number of data communication events for each attack vector into a weight value. In another example, the weight component may use a machine-learning algorithm to analyze an importance of an attack vector compare to other attack vectors based on one or more factors. These factors may include the amounts of input data received versus output data generated by each attack vector or the asset associated with each attack vector, data processing delay caused by the malfunction of each attack vector, an amount of computing resources consumed by each attack vector, the dependencies between the attack vectors, and/or so forth. The machine-learning algorithm may make use of supervised learning, unsupervised learning, and/or semi-supervised learning to analyze the information to generate the weighing values. The machine-learning algorithm may include various classifiers. For instance, various classification schemes (explicitly and/or implicitly trained) and/or systems (e.g., support vector machines, neural networks, expert systems, Bayesian belief networks, fuzzy logic, data fusion module, and/or so forth) may be employed. Other directed and undirected model classification approaches that may be employed by the machine-learning may include naïve Bayes, Bayesian networks, decision trees, neural networks, and/or probabilistic classification models.

In some embodiments, the multi-vector detection module 106 may generate a data report in real-time. The data report may identify the attack vector that is under attack along with the one or more additional attack vectors that are determined to be potentially under attack via the similarity search. The multi-vector detector module 106 may provide the data report for display via a user interface of a display device, or provide the data report to the threat model module 108. In alternative embodiments, the multi-vector detection module 106 may perform the similarity search and/or the generation of the data report on a periodic basis rather than in real-time.

The threat model module 108 may generate a threat model 126 that includes the additional attack vectors that are deemed to be potentially under attack due to their similarity to an attack vector that is determined to be under attack. The threat model 126 identifies vulnerabilities in the enterprise, and may further identify or help to identify techniques to mitigate any identified respective computer security risk. The threat model 126 may model multiple attack surfaces, in which the attack surfaces are often represented with attack trees. Attack trees are computer security constructs that store the preconditions and antecedents for vulnerabilities in a computer network. Typically, the tree may be comprised of a parent node each with a set of child nodes. Child nodes interior to the tree will have their own respective child nodes (grandchild nodes to the parent node). Child nodes that do not have their own child nodes are leaf nodes. Each parent node stores a potential vulnerability to a network. The child nodes for that parent node are potential vectors to exploit the vulnerability stored in the parent node. For example, a parent node may store the notion that a virus may infect a file. The parent node may have a first child node storing the vector of the virus executing as an administrator and a second child node storing the vector of the virus executing with non-administrative privileges. The child node storing the vector of the virus executing as an administrator may in turn have its own respective child nodes storing the notion of the virus exploiting a root hole and the notion of the virus running with a compromised administrative account.

Because attack trees store attack vectors, attack trees are used to develop threat matrices. A threat matrix is a master list of all threats to a network, cross referenced to potential remediation responses. However, because attack trees do not store explicit responses, they do not provide remediation information to develop a complete threat matrix. Furthermore, conventional techniques for developing attack trees is fundamentally manual in nature. Accordingly, developing and maintaining attack trees is complex and time consuming. Specifically, conventional attack tree techniques do not have the capability to dynamically generate attack trees.

An attack tree may be developed for a particular class of vulnerabilities. For example, a first attack tree may store vulnerabilities from technical attacks and a second attack tree may store vulnerabilities from social attacks. Those two attack trees may also be combined into a single threat matrix. However, with conventional techniques, preconditions for attacks stored in the two attack trees would not be correlated together, despite being in the same threat matrix. Specifically, prior art techniques do not contemplate a child node in one attack tree being a potential precondition and therefore a potential child in a second attack tree.

In general, conventional threat modeling techniques suffer from having a single threat actor goal. Specifically, conventional processes for developing a threat model are linear in nature, even though real world attacks can be lateral, i.e., attacks initially stored in one attack tree eventually evolve into an attack stored in another attack tree. For example, an indicator that an attack under a social model (i.e., stored in an attack tree comprised of social and/or human factor data) is not used as an indicator to expect a technical threat (i.e., store in an attack tree comprised of technical attack data). For example, knowledge that an employee has been bypassed for a raise for the past three reviews may not trigger a response to check that the employee is an IT worker and may attempt to do a technical attack against a server.

Attack trees do lend themselves to incorporating data from many data sources, internal and external to organizations. However, in practice, threat matrices often only use as input internally developed threat models. All too often, threat matrices are not updated with events on other installations not under the responsibility of the corporate security officer. This is often a result not only of not having access to third party data, but also of prior art techniques already being time intensive to develop an attack tree from internal data alone.

Accordingly, in some embodiments, the threat model 126 may be a recombinant threat model that recognizes differentiation in the threat space. A recombinant threat model maps threats and their respective attack vectors. Recombinant threat models may be combined into a series of overlapping "threat landscapes". The threat landscapes may then be combined into a final "threat matrix" for an installation. Because of the properties described herein, recombinant threat models may be cross correlated, and may be extended using third party data.

Figure 3:
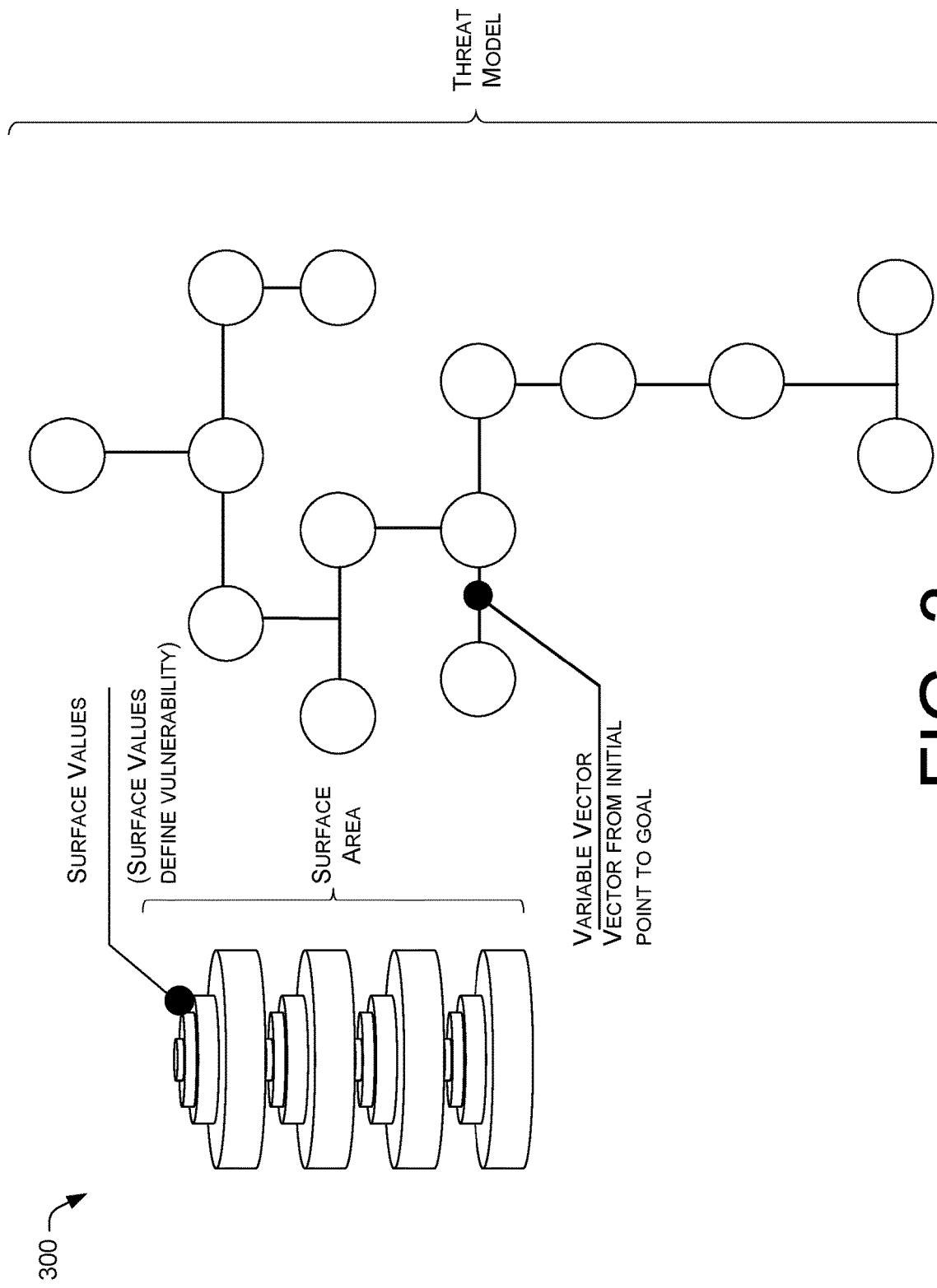
FIG. 3 illustrates the relationships between threats, attack vectors, and threat models as an array of attack surfaces and their respective attack vectors relative to one or more assets.

A recombinant threat model may be constructed as an array of attack surfaces with their respective attack vectors relative to one or more assets as illustrated in FIG. 3. Attack surfaces are composed of vulnerabilities associated with one or more attributes describing the respective vulnerability. Attack surfaces are generally presented in the context of a family of potential threats, called a threat model. For example, one attack surface may be comprised of threats from weak encryption. Another attack surface may be comprised of threats from inadvertently exposed points in a server. Yet another attack surface may be comprised threats from human factors (e.g., disgruntled employees, compromised employees, human error).

Figure 2:
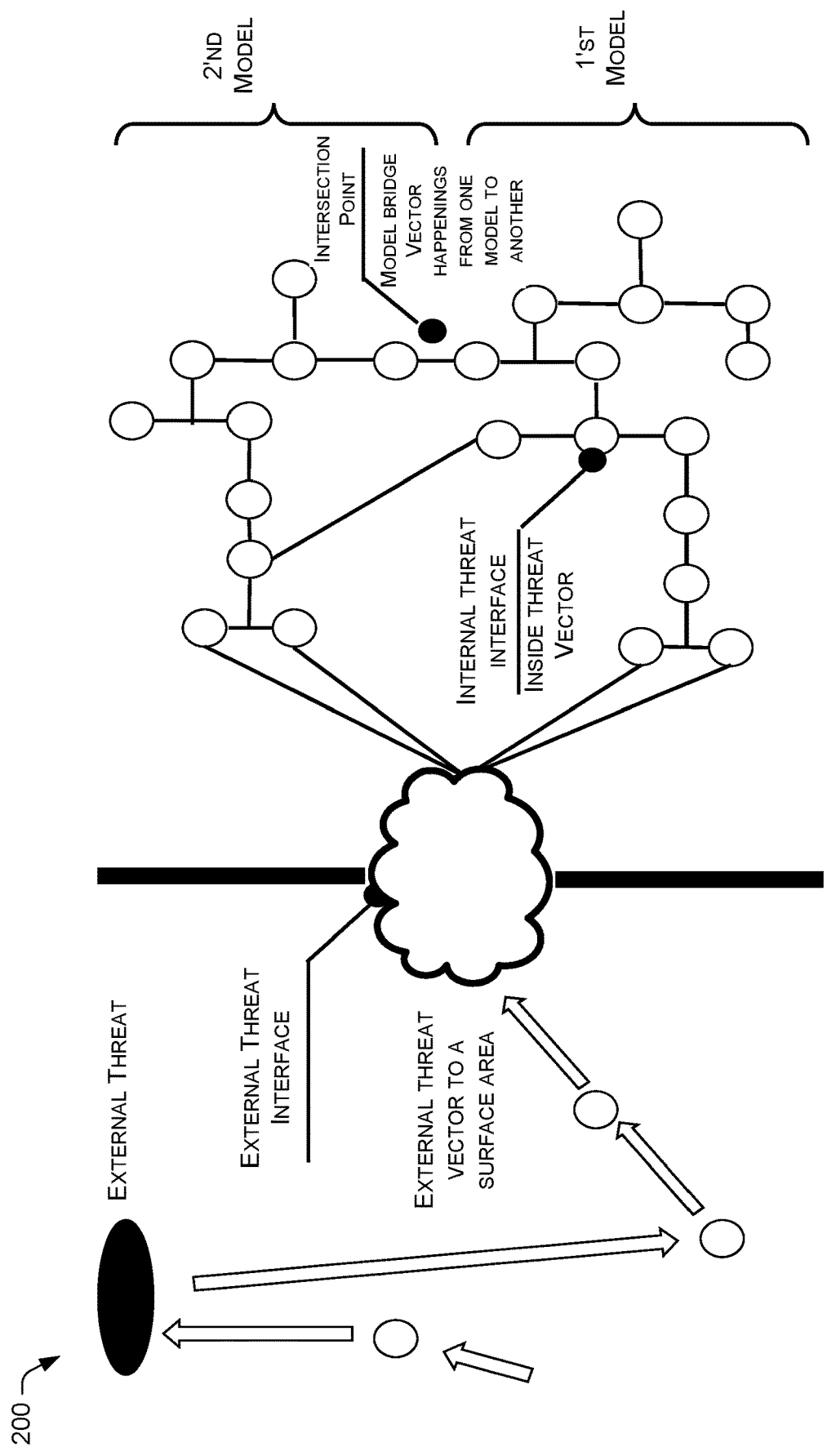
FIG. 2 is a diagram showing the intersection of two threat models within the same threat matrix.

Surface areas may have one or more "attack vectors", and a threat accesses an attack surface by exploiting an attack vector. An attack surface may be modeled by various attributes. For example, an attack surface may be a set of technical vectors or non-technical vectors. This is illustrated in FIG. 2 in which a threat model comprises an external attack surface including an attack vector (such as an NT Ping of Death), and an internal attack surface (such as a disgruntled employee). Attributes may be automated (derived or inferred via computer automation), ingested (imported into the threat model) or observed. For example, an asset's attack history may be imported (ingested), and then marked as a portion of the attack surface that has more risk (automated/derived), by virtue of the corresponding asset having an attack history. Alternatively, a security team may observe an attack in progress.

Figure 4:
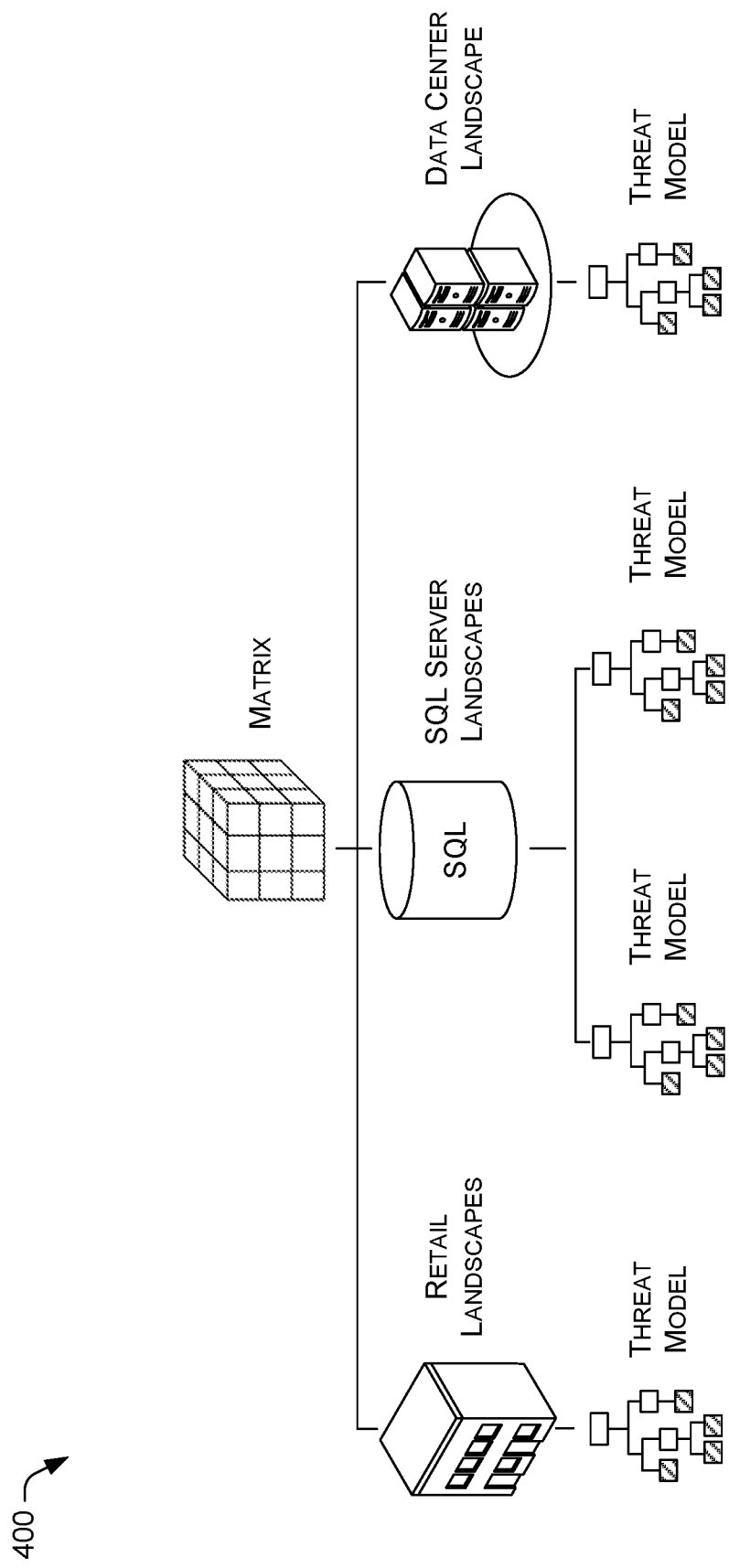
FIG. 4 illustrates the relationship between threat models, threat landscapes, and threat matrices.

A threat matrix is comprised of a set of threat landscapes, and a threat landscape is comprised of a set of recombinant threat models as illustrated in FIG. 4. A recombinant threat model may stand on its own within the threat landscape. Alternatively, multiple recombinant threat models may be interconnected together. A threat landscape represents the computer security threats to a logical grouping of assets, such as a set of servers and/or end user computers that provide a function. Some examples of assets covered by a threat landscape include retail centers, data centers, a grouping of similar server types, executive management group and others. A set of threat landscapes in turn comprise a threat matrix that represents all the threats faced by an enterprise, government or an organization in general.

A recombinant threat model may not only identify potential attack vectors and associated responses, but may also identify threat indicators. A threat indicator, is some detectable event that may be subtle or obvious that suggests that a vulnerability is likely to be exploited by a threat. Therefore, threat indicators will trigger responses to prevent, contain, or eliminate an attack in progress. Thus, remediation is accomplished by performing one or more responses for a threat.

For each attack vector, a corporate security officer or other responsible party ideally will have identified a response. The response ideally is proactive by preventing the attack or eliminating the vulnerability. For example, a threat may come from a disgruntled worker. Firing and removing the worker may prevent the attack. Alternatively, the NT Ping of Death could be eliminated by upgrading all NT servers to a later version, or by closing the vulnerable port. Sometimes the response may be reactive, where damage is limited and contained prior to stopping the attack. Reactive responses are generally dynamic in nature, and are triggered upon detecting a threat indicator.

Thus, a threat matrix comprised of recombinant threat models may be populated not only with attack vectors grouped into attack surfaces, it may be cross referenced to responses corresponding to a respective attack vector, and be cross referenced to threat indicators which if detected indicate a likelihood that a corresponding attack vector is about to occur.

In some instances, attack vectors indicated in an attack surface are not necessarily actual attacks in progress but rather represent potential attack. Accordingly, not all attack vectors indicated in an attack surface will be exploited by a threat. In fact, ideally none of the attack vectors would be exploited in the first place, and all responses would be proactive. However, in practice organizations are in fact attacked. A threat matrix not only can store responses, it can also store what threats have exploited attack vectors, and it can also store the effectiveness of the response. In this way, the threat matrix can track efficacy of responses. In practice, some responses are effective, but unfortunately some are not. A corporate security officer or other responsible party may then update the threat matrix with improved responses, thereby eliminating the previously exploited threat as a risk.

Example Environment

Figure 5:
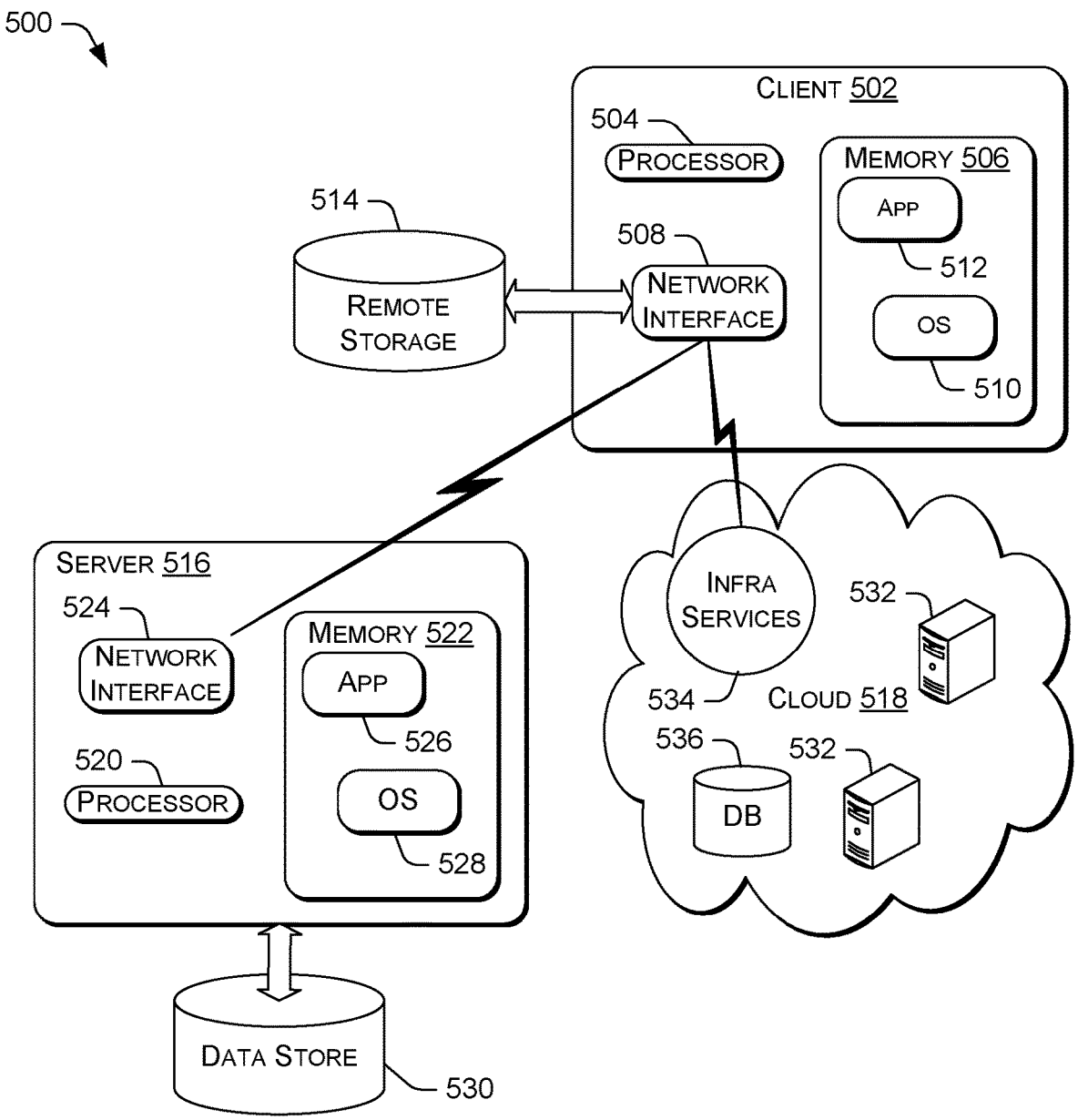
FIG. 5 is an example environment for applying a similarity search to discover multiple vector attacks, and implementing recombinant threat models and threat matrices.

FIG. 5 is an example environment 500 for applying a similarity search to discover multiple vector attacks, and implementing recombinant threat models and threat matrices. The requests to initiate the generation of the threat model 126 may be performed from a client machine 502. A client machine 502 may be any device with a processor 504, memory, 506 and a network interface 508 sufficient to connect to a cloud server, either directly or via the Internet. Typically, there will be an operating system 510 and one or more applications 512 resident in the memory 506. Typical configurations are a central processing unit, RAM, and Wi-Fi or Ethernet connectivity. The memory 506 will be computer-readable media and/or will have access to other computer-readable media, and will run a client application 512 comprised of computer executable code resident in the memory and/or other computer-readable media. The client machine 502 may have access to remote storage 514 such as Network Aware Storage (NAS) 516 on the local network.

Similarly, a server 516 or cloud services 518 hosting the server side of the recombinant threat model infrastructure may be a device with a processor 520, memory 522, and a network interface 524 sufficient to connect to a client machine either directly or via the Internet. As with a client machine, typically there will be an operating system. Typical configurations are a central processing unit, RAM, and Wi-Fi or Ethernet connectivity. The memory will be computer-readable media and/or will have access to other computer-readable media, and will run an application 526 and operating system 528 comprised of computer executable code resident in the memory and/or other computer-readable media. The server may access have a database or data store 530 locally or on its local network.

A cloud server 532 may generally run a virtualization environment 534 that may create virtual machines. In each virtual machine, there may be an operating system, or system level environment. Each virtual machine may spawn processes, each of which may spawn threads. An execution environment such as a Java Virtual Machine, or .NET runtime may execute in a virtual machine and manage processes and threads. Servers 532 may also come in the form of database servers 536 as well. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Figure 6:
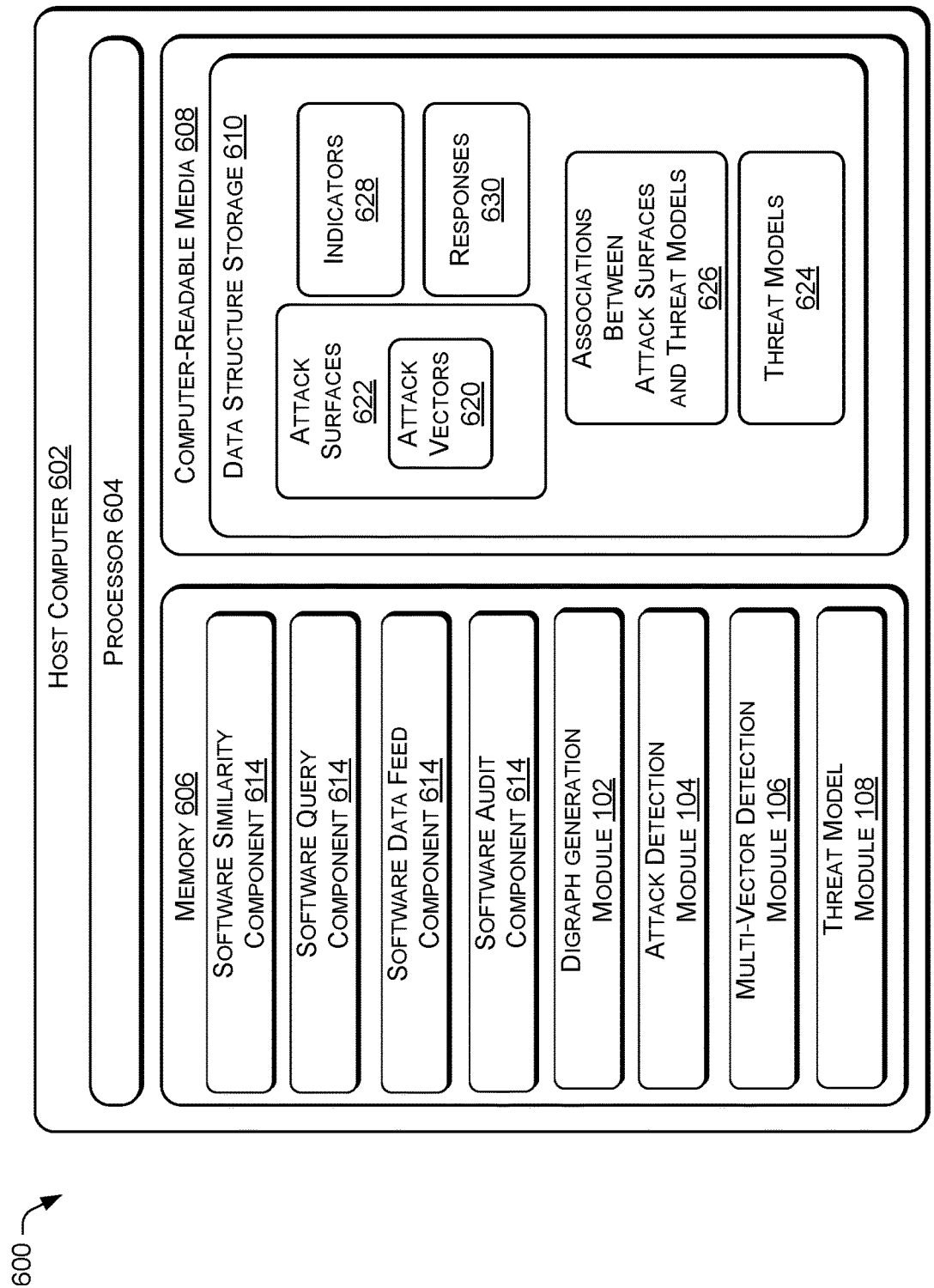
FIG. 6 is a block diagram showing various components of the example environment for applying the similarity search to discover multiple vector attacks, and implementing the recombinant threat models and threat matrices.

FIG. 6 is a block diagram showing various components of the example environment for applying the similarity search to discover multiple vector attacks, and implementing the recombinant threat models and threat matrices. The configuration comprises a computer host system 602 with a processor 604, a computer-readable memory 606, and a computer-readable medium 608. The memory 606 may be RAM and the computer-readable medium 606 may be persistent such as a disk storage. The computer-readable medium may store a data structure storage 610 for recombinant threat models and threat matrices. The data structure storage 610 is a software data structure, such as a graph or set of tables to store recombinant threat model data. The computer-readable medium 608 may be separate from the processor 604 and memory 606 and may execute on a network aware storage or a database server on the network, on the Internet, or on a cloud service. The memory 606 may store the digraph generation module 102, the attack detection module 104, the multi-vector detection module 106, and the threat model module 108. The memory 606 may further store a software query component 612, a software similarity component 614, a software data feed component 616, and a software audit component 618. Each of the modules and components may include routines, program instructions, objects, and/or data structures that perform particular tasks or implement particular abstract data types.

The software query component 612 is configured to receive query data. Typical query data is in the form of an observed event. The observed event may be described with one or more attributes. The software query component may also receive a filter indicator. When performing a query, the software query component 612 communicates with a software similarity component 614 that provides similarity scores between entities. Entities are comprised of a set of attributes and are described further with respect to the discussion around the data structure storage 610 below.

The software similarity component 614 may apply a similarity score between two entities. In one embodiment the software similarity component 614 may enumerate at least some attributes (sometimes called fields) for a first entity and enumerate at least some attributes for a second entity. First, the field names and types are then aligned by similarity of name and type. Then the values of the fields are subjected to similarity score. The similarity between the two entities may the normalized sum of the constituent pairwise attribute similarities. In this way, entities with different attributes may be scored for similarity. Note that the software similarity component 614 does not actually state that entities are in fact similar. Rather it merely generates a score. The similarity score is used in conjunction with a predetermined threshold, which if exceeded, indicates sufficient similarity. Accordingly, the software similar component 614 may be used by the multi-vector detection module 106 to generate similarity scores for attribute values of attack vectors.

The software similarity component 614 may also be used in conjunction with a software data feed component 616. The software data feed component 616 is a loader that received attack vector, attack surface, and threat model data. The software data feed component 616 loads the attack vector, attack surface and threat model data into respective instances. However, the software data feed component 616 may use the software similarity component 614 to create or infer associations between threat models and attack surfaces. This is possible because the software similarity component 614 performs pairwise attribute comparisons.

It is possible that associations inferred between entities by the software query component 612 during query time, and the software data feed component 616 at load time may not be correct. Accordingly, any use or creation of an inferred association is stored by a software audit component 618.

The data structure storage 610 stores entities that may have different attributes. Entities include attack vectors 620, attack surfaces 622, threat models 624 and associations of attack surfaces and threat models 626. Records for each entity are called instances. Note that the data structure storage need not be implemented as a relational database. Each entity might be specified as an abstract base class, so that an instance that derives from the abstract base class may have different attributes. For example, an attack surface instance may have different attributes with a second attack surface instance.

Attack vector 620 and attack surface entities 622 not only are associated with vulnerabilities and attack surfaces respectively, but may also be associated with indicator data 628 and with response data 630. Indicator data 628 describe events that if observed change the likelihood that the respective attack vector and attack surface will occur. Typically, indicators show that the likelihood is increasing, and that responses to remediate should be taken proactively.

The associated response data 630 stores recommended remediation procedures for the respective attack vector and attack surface. The response data 630 can also store an indicator, such as a field or flag, that the response is not effective. This efficacy data may be used to change the priority of responses returned during a query.

Example Threat Model Methods

Recombinant threat models may store information about (a) attack surfaces and their associated attack vectors, (b) network assets targeted by those attack vectors, (c) threat profiles in the form of indicators, (d) attack histories, and (e) historical responses to attacks. The recombinant threat models may be combined into a unified threat matrix. The information stored would not be limited to a particular company or installation, but would include publically available information. The threat matrix may be used to correlate threats from different recombinant threat models and to quickly and automatically update responses stored in the threat matrix. The development of recombinant threat model may involve the initial population of the recombinant threat model, the determination of response to indicators of attack, and the updating of the recombinant threat model.

In the initial population of the threat model, inputs into a proposed threat matrix include attack vectors collected into one or more attack surfaces, attack histories, and historical responses are inputted into a proposed threat matrix. Sources for attack surfaces may include internal data organized into existing attack trees. Other sources may include third party sources such as data from the Federal Government via the National Institute of Standards and Technology.

The attack vectors may also be correlated with Indicators from threat profiles and other sources. Indicators may be gleaned by reviewing attack histories (e.g., from SIEM) and from historical responses. Collection of historical responses may be automated via RSS feeds, external fees, or spiders programmed to crawl the Internet searching for reports of cyberattacks.

In this way, a threat matrix comprised of recombinant threat models would be more complete, and would take advantage of cross-correlating information from different threat models, thereby producing a more robust way to detecting attacks and way to respond. By analyzing the threat matrix using machine learning and pattern matching capabilities, a Corporate Security Officer will be able to address threat intelligence from a lateral perspective providing the Corporate Security Officer a much more accurate picture of threat relative to threat landscapes and thereby more accurately assess organizational risk.

Figure 7:
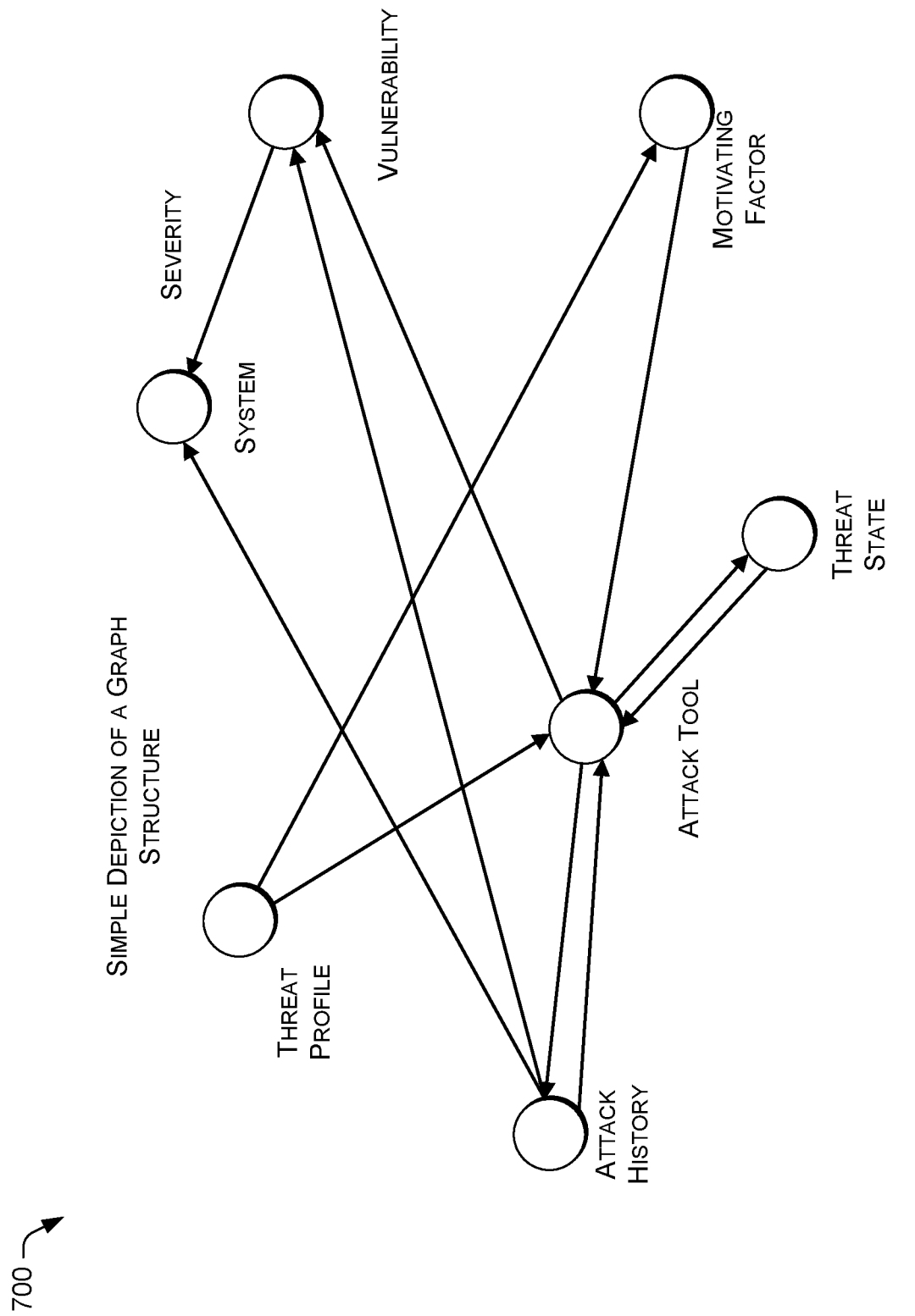
FIG. 7 is an exemplary graph structure that supports recombinant threat models and threat matrices.

The underlying data structure for the threat matrix and recombinant threat models may be in the form of a digraph data structure (hereinafter "graph"), in which an example diagraph data structure is illustrated in FIG. 7. Data representing technical and non-technical data points will be ingested into a graph data structure as a series of graph nodes. Each node represents an entity within the threat matrix and may represent a threat actor, a threat profile, a vulnerability, attack history, a response, or the like. Nodes may have multiple properties and labels. Nodes have relationships (edges) to other nodes that can also contain properties. Nodes and relations are used to develop the threat model.

Relationships within the graph determine how the surface areas or model nodes are developed. Relations in the threat model represent vectors from a surface area to another surface area. Note that since all the nodes are in the same graph, a node from one threat model may be connected and therefore correlated to a node from a different threat model. Further note that since historical responses include input from spiders, this approach automates the addition of third party threat information from outside the organization.

The structure of the nodes themselves may be in the form of abstract classes where records are represented as object instances. One proposed model might be to have an abstract class each for an attack vector, an abstract class for a recombinant threat model, and to store the threat model instances in a threat matrix comprised of a graph of the threat model and attack vector instances. The attack vector instances could be grouped together to comprise attack surfaces.

The threat matrix may be implemented as a graph of threat model abstract classes. In effect the threat matrix becomes a map of the threat model Instances. This allows an arbitrary threat model instance, with arbitrary attributes to be part of the threat matrix graph.

An attack surface (call it S) may store the particular attributes for a Human Factors vulnerability for a compromised employee as follows:
Employee Tenure=No
Last Review=Bad
Salary=Clerical Range A recombinant threat model (M) may have the particular attributes, also for a human factors vulnerability as follows:

Length of Term=1 year
Job Performance=⅖
Compensation=$30,000

To determine whether a threat model should be associated with an Attack Vector, a matching/similarity algorithm may match surface S to model M. Note that the attributes may have different names and may have different value types. First, the matching/similarity algorithm may determine that the "Last Review attribute in S maps to "Job Performance" attribute in M. Then, the matching/similarity algorithm may determine that the binary Bad/Good "Last Review attribute in S is similar to the 2 out of 5 scalar "Job Performance" attribute value in M and therefore matches. Various known similarity scoring and fuzzy logic scoring algorithms may be applied.

A predetermined threshold for similarity may be applied to the matching/similarity algorithm. Specifically, the matching/similarity algorithm takes a threat model instance and enumerates the attributes of that threat model instance. The algorithm then selects a candidate attack surface instance to associate with the threat model and enumerates the attack surface's attributes. The algorithm pairwise calculates the similarity of the threat model instance attributes with the attack surface instance attributes. The algorithm then calculates a relevancy score of the threat model instance to the attack surface instance. If the relevancy score exceeds the predetermined threshold, then the threat model instance and the attack surface instance are to be associated.

Upon populating the threat matrix, responses to indicators of attack may be determined. Initially, the system receives an observed event, in which the observed event is comprised of a set of attributes that are comparable to indicator data associated with attack vector instances and attack surfaces. The system then searches the graph for indicators that are similar to the observed event. The software similarity component may perform attribute comparisons if the attributes of the observed event are different from the indicator to be analyzed. Where an indicator is found to exceed a predetermined threshold of similarity, the associated attack vector instances and associated attack surface instances are retrieved.

Note that any of the entities in the data structure storage may be associated with an indicator, such as a flag or a field, that it is associated with a filter. If the software query component is configured to run a query with a filter, i.e., in fast query mode, the software query component will only perform similarity searches on nodes with the appropriate filter indicator set. Because comparing fields is faster than performing similarity searches, fast query mode typically will be faster than a query solely performing similarity searches. Responses associated with the retrieved attack vector instances and attack surface instances are reported by the system. At least some of the responses are performed for remediation.

Recall that one of the features of recombinant threat models is to provide data from more than one model. The system can identify a first set of threat models associated with returned attack surface instances. Accordingly, the software similarity component may also, upon the direction of a user, create a second set of threat models and attack surfaces similar to threat models in the first set of threat models. Note that the software similarity component may compare not only threat models to threat models but also threat models with attack surfaces.

This second set in turn provides a user with another set of potential remediation methods. Specifically, the attack surfaces and the attack vectors associated with returned attack surfaces are associated with response data. The user may perform at least some of the remediation procedures described in the response data as well. Another feature of the recombinant threat models is to reduce the likelihood of false positives in remediation. Specifically, a user should be presented with remediation responses most likely to address an attack without overwhelming the user with the volume of potential responses.

Where responses are found to be ineffective or not relevant, the graph can determine which responses would not have been retrieved had a different predetermined threshold of similarity been used. Specifically, ineffective or not relevant responses (false positives) are collected and their respective attack surfaces and threat models reviewed. If the majority of false positives were from the second set of retrieved threat models and attack surfaces, then a higher predetermined threshold is recommended.

The threat matrix and the underlying threat models ideally are updated from time to time. Some threats or attacks expire. New Response techniques are developed. Automatically generated correlations may be incorrect. As the size of the threat matrix grows, performance optimizations may be added.

One optimization is to prune expired threats and attacks from the underlying graph. In the case for a threat, an event occurs indicating that a party is no longer a threat. For example, a long time hacker is arrested. In that event, the graph may be searched for all attacks associated with the threat. Data associated solely with that threat may be removed from the graph and archived. It is important not to remove data for attacks that are associated with other threat entities, since those attacks may still be initiated, albeit by another threat entity.

In the case of expired attacks, an event occurs indicating that an attack vector is no longer a vulnerability. For example, there may be a router subject to an attack that has been removed from the network. Since the router is no longer in the network, it is no longer a vulnerability. Accordingly, attacks specific to that router may be removed.

Alternative to removal, data associated with an expired threat or attack may simply be marked with a low priority as to be skipped for a fast graph traversal. Specifically, as the graph is traversed, if user or machine searching the graph so indicates, searches will skip nodes marked with a low priority, thereby saving the processing time to compare low priority nodes.

In general, the graph may be subject to different filters. Since over time, the graph will grow to be quite large, nodes belonging to a commonly traversed subset may store a flag or field value indicating that it belongs to a particular subset. Traversals subject to a filter on the subset would then only review nodes with the corresponding flag or field value set. Commonly accessed nodes may also be cached. Specifically, some graph queries are commonly executed. Accordingly, where the data is expected to be static, those nodes may be cached to speed retrieval.

Example Attack Vector Discovery Processes

Figure 8:
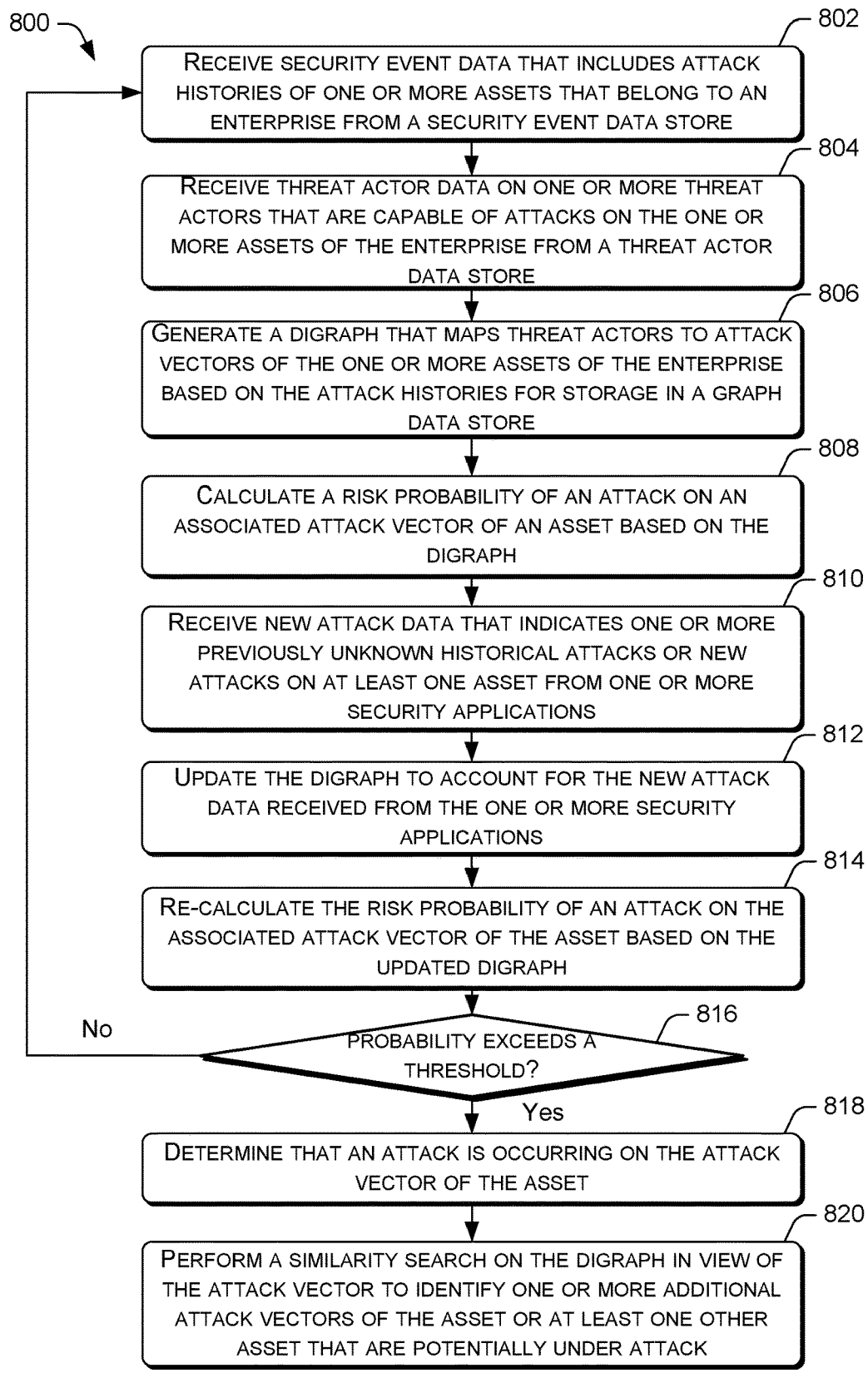
FIG. 8 is a flow diagram of an example process for performing a similarity search on a digraph to detect additional attack vectors that are under attack following the detection of an attack on an attack vector of an asset.
Figure 9:
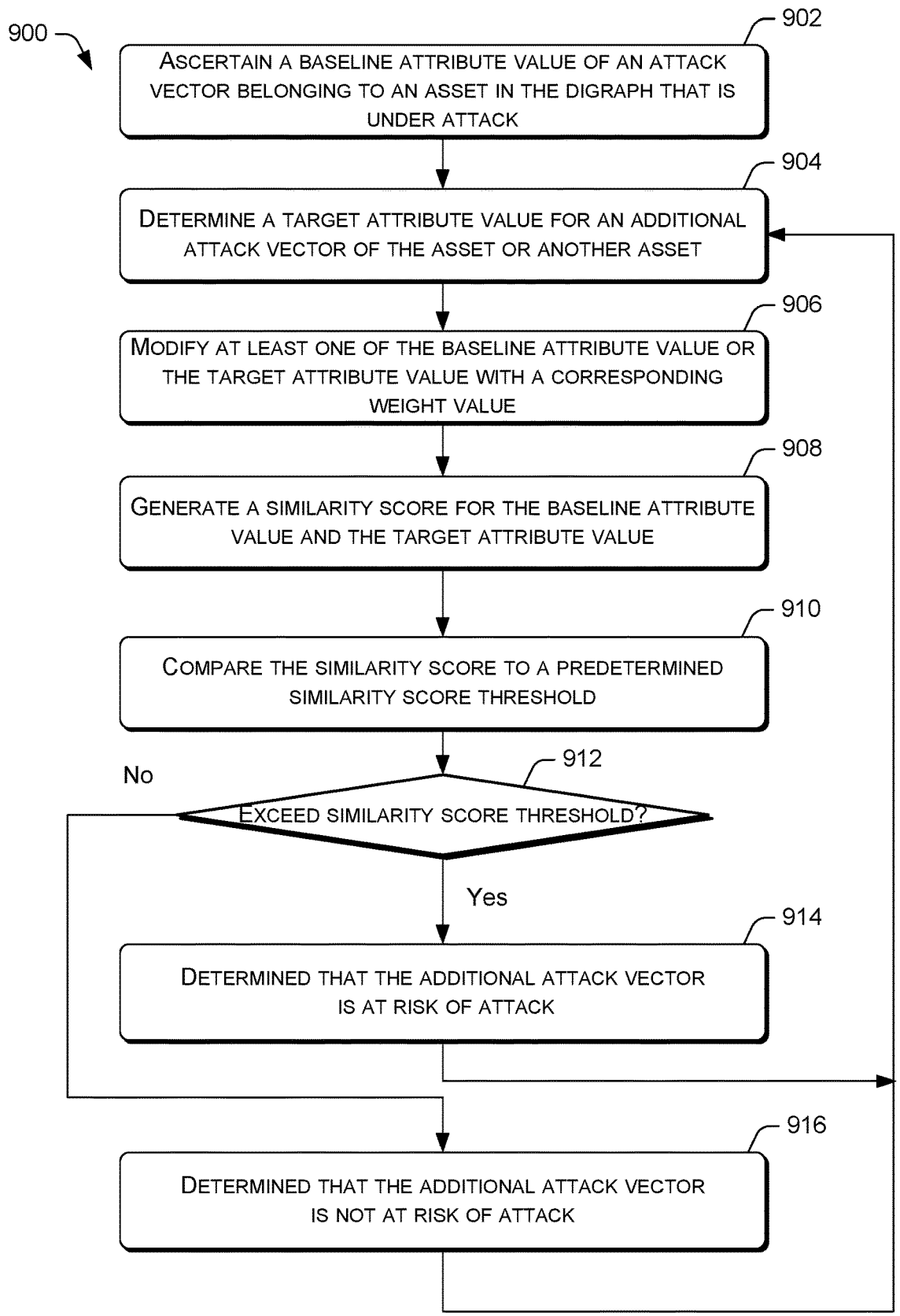
FIG. 9 is a flow diagram of an example process for using attribute values of attack vectors to determine whether additional attack vectors of an asset are at risk of attack.

FIGS. 8 and 9 present illustrative processes 800 and 900 for using a similarity search to discover multiple vector attacks on the assets of an enterprise. Each of the processes 800 and 900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 800 and 900 are described with reference to the example architecture 100 of FIG. 1.

FIG. 8 is a flow diagram of an example process 800 for performing a similarity search on a digraph to detect additional attack vectors that are under attack following the detection of an attack on an attack vector of an asset.

At block 802, the digraph generation module 102 may receive security event data that includes attack histories of one or more assets that belong to an enterprise from a security event data store. In various embodiments, the security event data store 116 may include security event data from SIEM applications, IDSs, and/or vulnerability scanners that monitors the assets of the enterprise. The data feeds of the security event data may include system logs, event monitor logs, scan logs, and/or so forth. Security data feeds may also arrive from external sources, such as third-party privately operated network security event monitoring applications, network event detection systems operated by governmental agencies, and/or so forth.

At block 804, the digraph generation module 102 may receive threat actor data on one or more threat actors that are capable of attacks on the one or more assets of the enterprise from a threat actor data store. In various embodiments, the threat actor data store may include data profiles on the various threat actors that have attacked or may potentially attack the assets of the enterprise.

At block 806, the digraph generation module 102 may generate a digraph that maps threat actors to attack vectors of the one or more assets of the enterprise based on the attack histories for storage in a graph data store. An attack vector is a vulnerability in the defenses of an asset, and an attack is the exploiting of that vulnerability. In various embodiments, the digraph may include nodes that correspond to the assets of the enterprise, and edges connecting the nodes may indicate the relationship between the assets. The nodes may be further connected other nodes that represent the attack vectors of the assets and/or the threat actors.

At block 808, the attack detection module 104 may calculate a risk probability of an attack on an associated attack vector of an asset based on the digraph. The risk probability of the attack may be calculated using a probabilistic inference algorithm that perform inference and approximation functions on the digraph 112.

At block 810, the attack detection module 104 may receive new attack data that indicates one or more previously unknown historical attacks or one or more new attacks on at least one asset of the enterprise from one or more security applications. The new attacks may include real-time attacks and/or imminent attacks on the assets. The new attack data may be received from internal sources or external sources. The internal sources may include one or more security applications that are monitoring the assets of the enterprise. The external sources may include third-party privately operated network security event monitoring applications, network event detection systems operated by governmental agencies, and/or so forth.

At block 812, the digraph generation module 102 may update the digraph to account for the new attack data received from the one or more security applications. In various embodiments, the update of the digraph may be implemented via the generation of a new version of the digraph. At block 814, the attack detection module 104 may re-calculate the risk probability of an attack on an associated attack vector of an asset based on the updated digraph.

At decision block 816, the attack detection module 104 may determine whether the risk probability of the attack on the attack vector as calculated exceeds a predetermined probability threshold. Accordingly, if the risk probability of the attack exceeds the predetermined probability threshold ("yes" at decision block 816), the process 800 may proceed to block 818. At block 818, the attack detection module 104 may determine that an attack is occurring on the attack vector of the asset.

At block 820, the multi-vector detection module 106 may perform a similarity search on the digraph in view of the attack vector to identify one or more additional attack vectors of the asset or at least one other asset that are potentially under attack. In various embodiments, the similarity search may be topological similarity search, a semantics-based similarity search, a statistical similarity search, or another computer-implemented search of the digraph.

Returning to decision block 816, if the risk probability of the attack does not exceed ((i.e., equal to or less than) the predetermined probability threshold ("no" at decision block 816), the process 800 may loop back to block 802. In some alternative embodiments, the operations described in blocks 810-814 may be skipped. Accordingly, the operations described in blocks 816-820 may be performed directly after block 808. In other alternative embodiments, the operations described in block 808 may be skipped during the performance of the process 800.

FIG. 9 is a flow diagram of an example process 900 for using attribute values of attack vectors to determine whether additional attack vectors of an asset are at risk of attack. The process 900 may further block 820 of the process 800. At block 902, the multi-vector detection module 106 may ascertain a baseline attribute value of an attack vector for an asset in the digraph that is under attack. In various embodiments, the attribute value measures an attribute of the attack vector. In other words, the attribute of the attack vector may be a parameter of the attack vector, and the corresponding attribute value of the attribute may quantify or qualify the attribute.

At block 904, the multi-vector detection module 106 may determine a target attribute value for an additional attack vector of the asset or another asset. The target attribute value may be for an attribute of the additional attack vector that is identical to the attribute of the attack vector. At block 906, the multi-vector detection module 106 may modify at least one of the baseline attribute value or the target attribute value with a corresponding weight value. The assignment of each weight value by the multi-vector detection module 106 may be performed based on one or more characteristics that are common to the attack vector associated with the baseline attribute value and attack vector associated with the target attribute value, in which the characteristics impact the enterprise. However, in some instances, the multi-vector detection module 106 may omit the modification of attribute values with weight values.

At block 908, the multi-vector detection module 106 may generate a similarity score for the baseline attribute value and the target attribute value. In various embodiments, the similarity between the two attribute values may be the normalized sum of the constituent pairwise attribute similarities. In this way, a similarity score may show a similarity between the attribute value and the additional attribute value.

At block 910, the multi-vector detection module 106 my compare the similarity score to a predetermined similar score threshold. At decision block 912, if the multi-vector detection module 106 determines that the similarity score exceeds the similarity score threshold ("yes" at decision block 912), the process 900 may proceed to block 914. At block 914, the multi-vector detection module 106 may determine that the additional risk vector is at risk of attack. Subsequently, the process 900 may loop back to block 904 such that another attribute value of a subsequent attack vector may be compared for the purpose of identifying whether the subsequent attack vector is under risk of attack.

Returning to decision block 912, if the multi-vector detection module 106 determines that the similarity score does not exceed (i.e., equal to or less than) the similarity score threshold ("no" at decision block 908), the process 900 may proceed to block 916. At block 916, the multi-vector detection module 106 may determine that the additional risk vector is not at risk of attack. Subsequently, the process 900 may loop back to block 904 such that another attribute value of a subsequent attack vector may be compared for the purpose of identifying whether the subsequent attack vector is under risk of attack.

The techniques described herein may enable the identification of an attack vector that is currently experiencing the attack, as well as one or more additional vectors that are determined by the similarity search as potentially under attack by the same multiple vector attack. The attacks on the multiple attack vectors may be perpetrated by the same threat actor, or by different threat actors acting in concert on behalf of an organization. In contrast, a conventional security application may fail to detect such a multiple vector attack, thereby leaving some attack vectors of the assets vulnerable even if other attack vectors are successful protected by remedial protection measures.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a user device storing computer-executable instructions that upon execution cause one or more processors to perform acts comprising:
    receiving security event data that includes attack histories of one or more assets of an enterprise and threat actor data on one or more threat actors that are capable of attacks on the one or more assets of the enterprise;
    generating a digraph that maps threat actors to attack vectors of the one or more assets of the enterprise based on the attack histories;
    determining that an attack vector of an asset is under attack in response to a risk probability of attack that is calculated for the attack vector based on the digraph exceeding a predetermined probability threshold; and
    performing a similarity search on the digraph in view of the attack vector that is determined to be under attack to identify one or more additional attack vectors of the asset or at least one other asset that are potentially under attack.

2. The one or more non-transitory computer-readable media of claim 1, wherein the acts further comprise generating a threat model that includes the additional attack vectors that are potentially under attack.

3. The one or more non-transitory computer-readable media of claim 2, wherein the threat model is a recombination threat model that identifies a plurality of threat vectors and responses to at least one of prevent, contain, or eliminate attacks on the plurality of threat vectors.

4. The one or more non-transitory computer-readable media of claim 1, wherein the acts further comprise generating a data report that identifies the attack vector that is under attack and the one or more additional attack vectors that are potentially under attack in real-time or on a periodic basis.

5. The one or more non-transitory computer-readable media of claim 1, wherein the acts further comprise:
    receiving new attack data that indicates one or more previously unknown historical attacks or new attacks on an additional asset from one or more security applications;
    generating an updated digraph to account for the new attack data received from the one or more security applications;
    determining that the additional attack vector of an asset is under attack in response to an additional risk probability of attack that is calculated for the additional attack vector based on the updated digraph exceeding the predetermined probability threshold; and
    performing a similarity search on the digraph in view of the additional attack vector that is determined to be under attack to identify one or more other attack vectors of the asset or at least one other asset that are potentially under attack.

6. The one or more non-transitory computer-readable media of claim 5, wherein the new attack data indicates an attack on an attack vector belonging to an asset of the enterprise or a comparable asset of another enterprise.

7. The one or more non-transitory computer-readable media of claim 1, wherein the performing the similarity search includes performing a topological similarity search, a semantics-based similarity search, a statistical similarity search or the digraph.

8. The one or more non-transitory computer-readable media of claim 1, wherein the performing the similarity search includes:
    ascertaining a baseline attribute value of the attack vector of the asset that is under attack, the baseline attribute value quantifying or qualifying an attribute of the attack vector;
    determining a target attribute value for an additional attack vector of the asset or another asset of the enterprise, the target attribute value quantifying or qualifying an additional attribute of the additional attack vector that is identical to the attribute of the attack vector;
    generating a similarity score for the baseline attribute value and the target attribute value based on a normalized sum of pairwise attribute similarities between the baseline attribute value and the target attribute value;
    determining that the additional attack vector is at risk of attack in response to the similarity score exceeding a similarity score threshold; and
    determining that the additional attack vector is not at risk of attack in response to the similarity score being less than or equal to the similar score threshold.

9. The one or more non-transitory computer-readable media of claim 1, wherein the digraphs include nodes that represent assets and edges connecting the nodes represent relationships between the nodes, the edges including a bidirectional edge or a unidirectional edge.

10. The one or more non-transitory computer-readable media of claim 9, wherein the bidirectional edge represents mutual data exchange between a pair of nodes, and wherein the unidirectional edge represents a one-way data flow between another pair of nodes.

11. The one or more non-transitory computer-readable media claim 1, wherein the security event data includes data from at least one of a Security information and Event Management (SIEM) application, an Intrusion Detection System (IDS), or a vulnerability scanner that is operated by the enterprise or a third-party that is external to the enterprise.

12. A computing device, comprising:
    one or more processors; and
    memory including a plurality of computer-executable components that are executable by the one or more processors to perform a plurality of actions, the plurality of actions comprising:
        receiving security event data that includes attack histories of one or more assets of an enterprise and threat actor data on one or more threat actors that are capable of attacks on the one or more assets of the enterprise;
        generating a digraph that maps threat actors to attack vectors of the one or more assets of the enterprise based on the attack histories;
        receiving new attack data that indicates one or more previously unknown historical attacks or new attacks on at least one asset from one or more security applications;
        generating an updated digraph to account for the new attack data received from the one or more security applications;
        determining that an attack vector of an asset is under attack in response to a risk probability of attack that is calculated for the attack vector based on the updated digraph exceeding a predetermined probability threshold; and
        performing a similarity search on the updated digraph in view of the attack vector that is determined to be under attack to identify one or more additional attack vectors of the asset or at least one other asset that are potentially under attack.

13. The computing device of claim 12, wherein the plurality of actions further comprise generating a threat model that includes the additional attack vectors that are potentially under attack.

14. The computing device of claim 12, wherein the acts further comprise generating a data report that identifies the attack vector that is under attack and the one or more additional attack vectors that are potentially under attack in real-time or on a periodic basis.

15. The computing device of claim 12, wherein the performing the similarity search includes performing a topological similarity search, a semantics-based similarity search, a statistical similarity search or the digraph.

16. The computing device of claim 12, wherein the performing the similarity search includes:
    ascertaining a baseline attribute value of the attack vector of the asset that is under attack, the baseline attribute value quantifying or qualifying an attribute of the attack vector;

determining a target attribute value for an additional attack vector of the asset or another asset of the enterprise, the target attribute value quantifying or qualifying an additional attribute of the additional attack vector that is identical to the attribute of the attack vector;

generating a similarity score for the baseline attribute value and the target attribute value based on a normalized sum of pairwise attribute similarities between the baseline attribute value and the target attribute value;

determining that the additional attack vector is at risk of attack in response to the similarity score exceeding a similarity score threshold; and determining that the additional attack vector is not at risk of attack in response to the similarity score being less than or equal to the similar score threshold.

17. The computing device of claim 12, wherein the digraphs include nodes that represent assets and edges connecting the nodes represent relationships between the nodes, the edges including a bidirectional edge that represents mutual data exchange between a pair of nodes, or a unidirectional edge that represents a one-way data flow between another pair of nodes.

18. The computing device of claim 17, wherein the bidirectional edge represents mutual data exchange between a pair of nodes, and wherein the unidirectional edge represents a one-way data flow between another pair of nodes.

19. A computer-implemented method, comprising:

receiving, at the one or more computing devices, security event data that includes attack histories of one or more assets of an enterprise and threat actor data on one or more threat actors that are capable of attacks on the one or more assets of the enterprise;

generating, at the one or more computing devices, a digraph that maps threat actors to attack vectors of the one or more assets of the enterprise based on the attack histories;

determining, at the one or more computing devices, that an attack vector of an asset is under attack in response to a risk probability of attack that is calculated for the attack vector based on the digraph exceeding a predetermined probability threshold;

ascertaining, at the one or more computing devices, a baseline attribute value of the attack vector of the asset that is under attack, the baseline attribute value quantifying or qualifying an attribute of the attack vector;

determining, at the one or more computing devices, a target attribute value for an additional attack vector of the asset or another asset of the enterprise, the target attribute value quantifying or qualifying an additional attribute of the additional attack vector that is identical to the attribute of the attack vector;

generating, at the one or more computing devices, a similarity score for the baseline attribute value and the target attribute value based on a normalized sum of pairwise attribute similarities between the baseline attribute value and the target attribute value;

determining, at the one or more computing devices, that the additional attack vector is at risk of attack in response to the similarity score exceeding a similarity score threshold; and determining, at the one or more computing devices, that the additional attack vector is not at risk of attack in response to the similarity score being less than or equal to the similar score threshold.

20. The method of claim 19, wherein the security event data includes data from at least one of a Security information and Event Management (SIEM) application, an Intrusion Detection System (IDS), or a vulnerability scanner that is operated by the enterprise or a third-party that is external to the enterprise.

* * * * *